(12) United States Patent
Wang

(10) Patent No.: US 10,174,773 B2
(45) Date of Patent: Jan. 8, 2019

(54) CLAMPING DEVICE FOR BEING CONNECTED TO FRAME OF BICYCLE CARRY RACK

(71) Applicant: Chiu Kuei Wang, Taichung (TW)

(72) Inventor: Chiu Kuei Wang, Taichung (TW)

(73) Assignee: KING RACK INDUSTRIAL CO., LTD., Taichung (TW)

(*) Notice: Subject to any disclaimer, the term of this patent is extended or adjusted under 35 U.S.C. 154(b) by 0 days.

(21) Appl. No.: 15/925,709

(22) Filed: Mar. 19, 2018

(65) Prior Publication Data

US 2018/0274572 A1 Sep. 27, 2018

(30) Foreign Application Priority Data

Mar. 22, 2017 (TW) .............................. 106109605 A

(51) Int. Cl.
 *F16B 2/02* (2006.01)
 *F16B 2/12* (2006.01)
 *B60R 9/10* (2006.01)

(52) U.S. Cl.
 CPC ................. *F16B 2/12* (2013.01); *B60R 9/10* (2013.01); *F16B 2/02* (2013.01)

(58) Field of Classification Search
 CPC ... F16B 2/12; F16B 1/00; A47B 96/06; E04G 3/00; G09F 7/18; B60R 9/10; B60R 9/00; B60R 11/00
 USPC .............. 248/229.12, 229.1, 229.11, 229.13, 248/229.14; 224/319, 356, 324, 558, 570, 224/924
 See application file for complete search history.

(56) References Cited

U.S. PATENT DOCUMENTS

| | | | | |
|---|---|---|---|---|
| 1,688,148 A * | 10/1928 | Martin | ..................... | B60Q 7/00 211/86.01 |
| 6,503,019 B1 * | 1/2003 | Wang | ....................... | B62J 99/00 224/501 |
| 6,602,015 B1 * | 8/2003 | Evans | ..................... | B60R 9/048 224/924 |
| 8,393,506 B2 * | 3/2013 | Malm | ....................... | B60R 9/10 224/319 |
| 9,688,209 B2 * | 6/2017 | Cha | ......................... | B60R 9/048 |
| 2005/0082328 A1 * | 4/2005 | Lo | ............................ | B60R 9/06 224/499 |
| 2006/0157523 A1 * | 7/2006 | Girod | ....................... | B60R 9/10 224/497 |
| 2007/0108245 A1 * | 5/2007 | Ferman | ..................... | B60R 9/06 224/504 |

(Continued)

*Primary Examiner* — Nkeisha Smith
(74) *Attorney, Agent, or Firm* — Che-Yang Chen; Law Offices of Scott Warmuth

(57) ABSTRACT

A clamping device for a bicycle carry rack includes a tube with a first clamp unit and a second clamp unit respectively located on two ends thereof. A fastening unit includes a pin which is connected between the first and second clamp units. The first clamp unit includes a clamping slot and an entrance which communicates with the clamping slot. The entrance guides the frame of a bicycle carry rack into the clamping slot. The first clamp unit has a restriction recess for receiving a head of the pin, the other of the pin is threadedly connected to a knob. The head of the pin is removed from the restriction recess when the second clamp clamps, and the first clamp unit is pivotable relative to the pin, and to clamp the frame of the bicycle carry rack by its clamping slot via the entrance.

5 Claims, 12 Drawing Sheets

(56) References Cited

U.S. PATENT DOCUMENTS

2017/0066385 A1\* 3/2017 Dickinson ................ B60R 9/10

\* cited by examiner

CLAMPING DEVICE FOR BEING CONNECTED TO FRAME OF BICYCLE CARRY RACK

BACKGROUND OF THE INVENTION

1. Fields of the Invention

The present invention relates to a clamping device for quickly being connected to the frame of a bicycle carry rack.

2. Descriptions of Related Art

The conventional bicycle carry rack is usually connected to a hitch ball on rear end of a vehicle, and the bicycle carry rack has a clamp device that has one end secured to a frame of the bicycle carry rack, and the other end of the clamp device holds the top tube, for example, of a bicycle so that the bicycle is carried with the vehicle. The conventional clamp device includes a tube, a first clamp unit for clamping the frame of the bicycle carry rack, a second clamp unit for holding the bicycle, and a fastening unit. The first and second clamp units are connected to two ends of the tube, and the fastening unit keeps the first and second clamp units together. The tube of the clamp unit has two end members respectively connected to two ends thereof. The two ends of the tube respectively contact the first and second clamp units. The first clamp unit includes a movable jaw and a fixed jaw. The fixed jaw is secured by the fastening unit, and the movable jaw has a recess in the rear side thereof so that the tube can be engaged with the recess. An entrance is formed in the movable jaw and located across the fastening unit. By fastening or loosing the fastening unit, and pushing the tube away from the first clamp unit, the movable jaw is controlled to clamp or separate from the frame of the bicycle rack. Even if the diameter of the frame is slightly larger, the tube can be pushed toward the movable jaw to ensure that the fixed jaw and the movable jaw reliably clamp the frame of the bicycle carry rack.

After the tube is moved backward and the first clamp unit is released, the first clamp unit clamps the frame in reverse direction. Nevertheless, to clamp the first clamp unit to the frame in the reverse direction needs a certain level of skill, and the beginners need time to practice to easily finish the action.

The present invention intends to provide a clamping device that can easily clamp the frame of the bicycle carry rack.

SUMMARY OF THE INVENTION

The present invention relates to a clamping device for a bicycle carry rack, and comprises a tube, a first clamp unit, a second clamp unit and a fastening unit. The first clamp unit and the second clamp unit are respectively located on two ends of the tube, and an end member is connected to one end of the tube. The fastening unit includes a pin which includes a head and a threaded end respective formed on two ends thereof. The pin extends through the first clamp unit, the tube, a spring, the second clamp unit and is threadedly connected to a knob by the threaded end. The fastening unit is connected between the first and second clamp units. The first clamp unit is a C-shaped unit and includes a clamping slot and an entrance which communicates with the clamping slot. A notch is defined in the first clamp unit and communicates with the entrance. The clamping slot of the first clamp unit is adapted to clamp the frame of a bicycle carry rack via the entrance. A pivotal portion is formed in the first clamp unit and transversely located below the clamping slot. The first clamp unit is pivotable about the pivotal portion. A receiving groove is defined in the first clamping unit. A contact portion is formed between the clamping slot and the receiving groove. A restriction recess defined in the first clamp unit and located opposite to the receiving groove, and the head is removably located in the restriction recess.

Preferably, when the second clamp unit clamps, the spring pushes the end member to move the tube to travel a distance so that the head on the pin is separated from the restriction recess. The first clamp unit is pivoted and the contact portion contacts the tube. The clamping slot clamps the frame of the bicycle carry rack via the entrance, and the pin is engaged with the notch. The second clamp unit is released to force head on the pin to be engaged with the restriction recess.

Preferably, the clamping slot includes a ridged portion which clamps the frame of the bicycle carry rack.

Preferably, the clamping slot includes ridged portion on which a pad is put which is in contact with the frame of the bicycle carry rack.

Preferably, a guide portion is formed at connection area between the clamping slot and the entrance. The guide portion guides the frame of the bicycle carry rack into the clamping slot.

The advantages of the present invention are that the first clamp unit clamps the frame of bicycle carry rack by way of pushing the frame through the entrance, so that the users can easily complete the action.

The clamping device can be used for the frames of bicycle carry rack of different sizes. The fastening unit pulls the first and second clamp units secured together to firmly connected the clamp device to the frame of bicycle carry rack.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
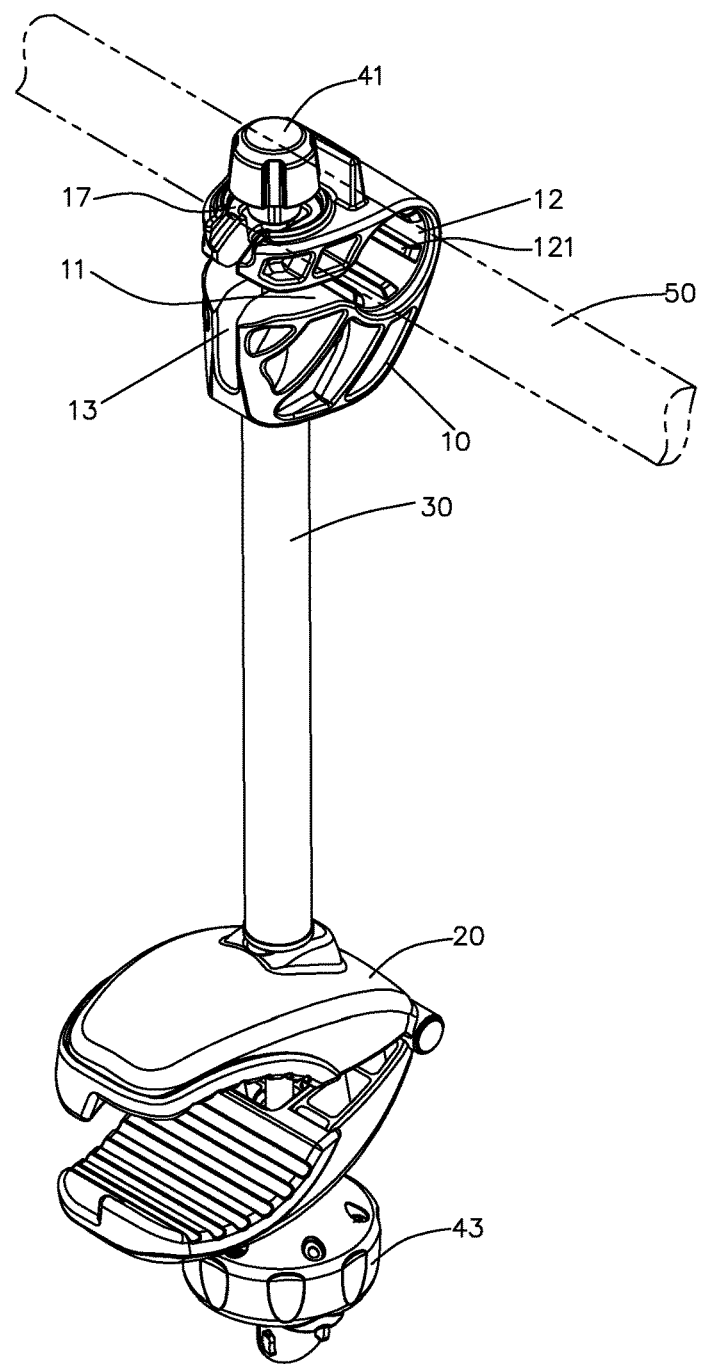
FIG. 1 is a perspective view to show the clamp device of the present invention.
Figure 2:
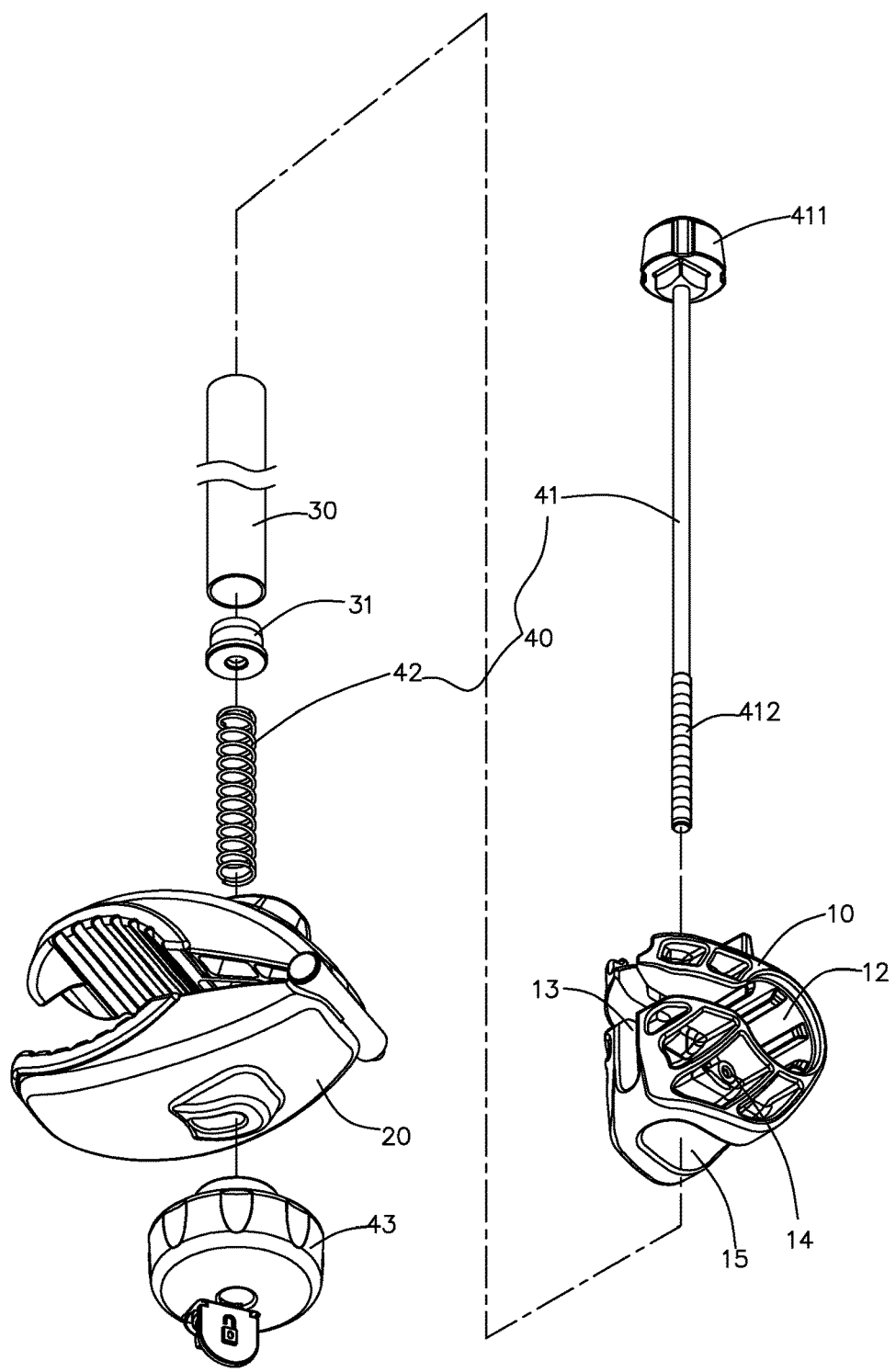
FIG. 2 is an exploded view to show the clamp device of the present invention.
Figure 3:
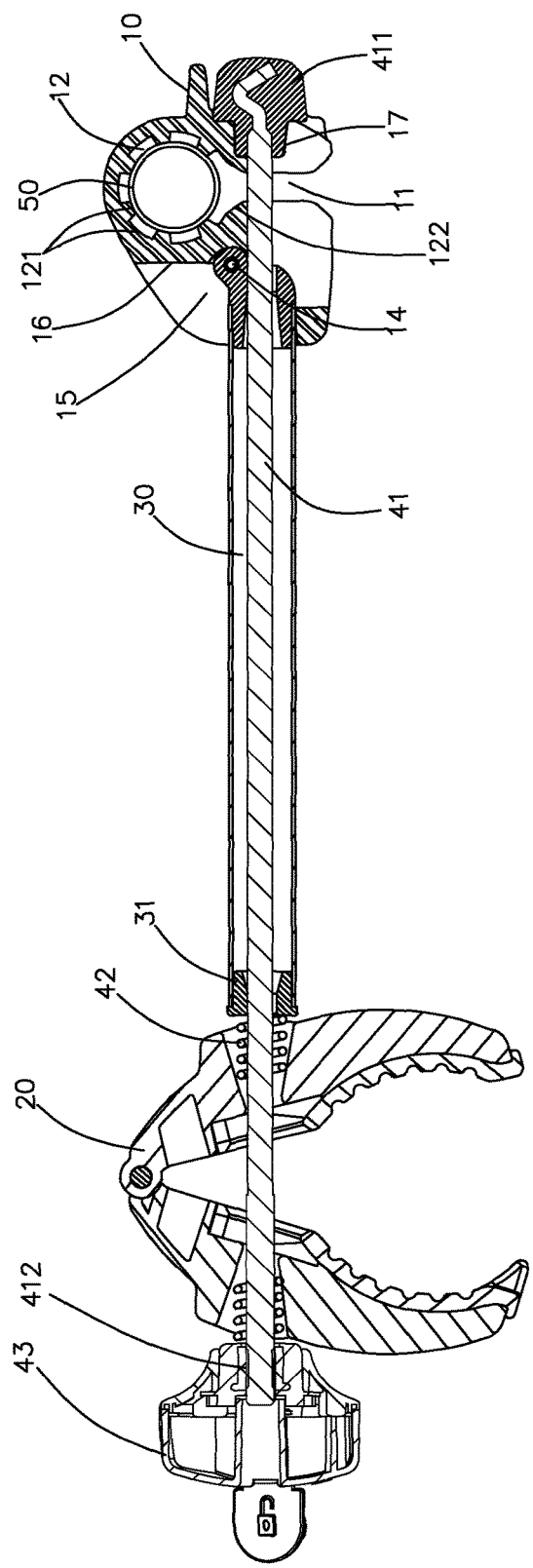
FIG. 3 is a cross sectional view of the clamp device of the present invention.

Referring to FIGS. 1 to 3, the clamping device for a bicycle carry rack of the present invention comprises a tube 30, a first clamp unit 10, a second clamp unit 20 and a fastening unit 40. The first clamp unit 10 and the second clamp unit 20 are respectively located on two ends of the tube 30, and an end member 31 is connected to one end of the tube 30 and is located close to the second clamp unit 20. The fastening unit 40 includes a pin 41 which includes a head 411 and a threaded end 412 respective formed on two ends thereof. The pin 41 extends through the first clamp unit 10, the tube 30, the second clamp unit 20, a spring 42, the second clamp unit 20 and is threadedly connected to a knob 43 by the threaded end 412. The spring 42 is connected to the second clamp unit 20 and used to allow the second clamp unit 20 to proceed clamping and opening actions. The fastening unit 40 is connected between the first and second clamp units 10, 20.

Figure 5:
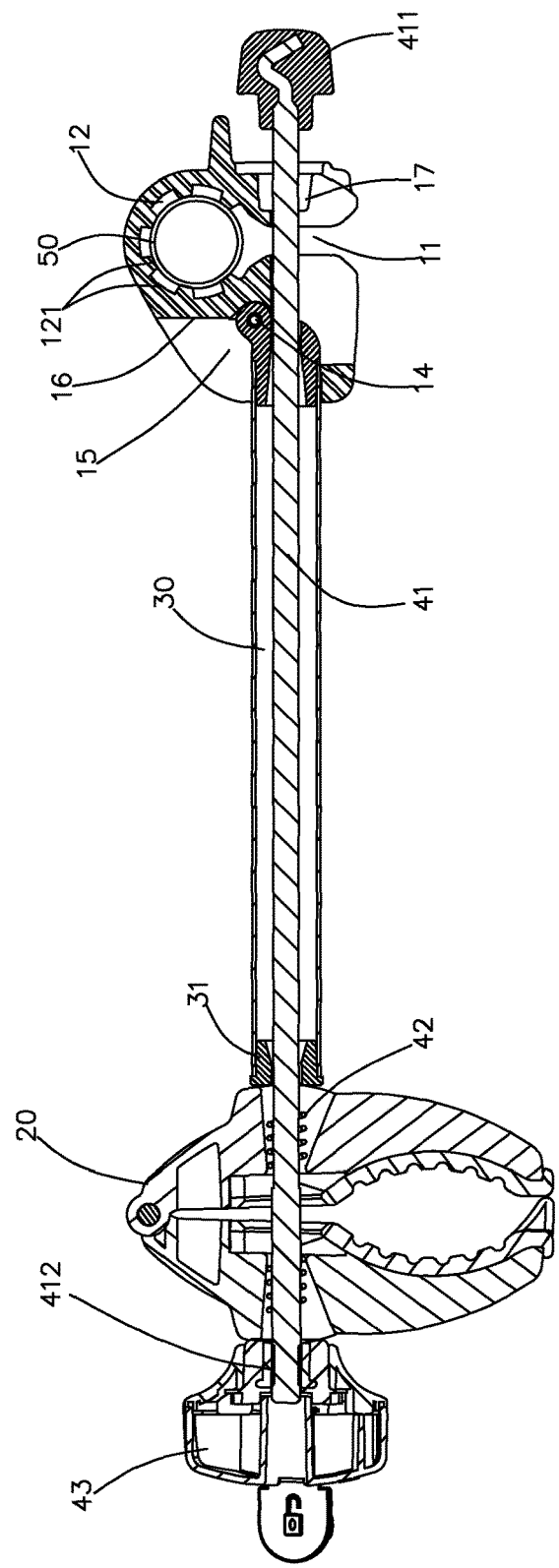
FIG. 5 shows that the head on the pin is separated from the restriction recess.
Figure 6:
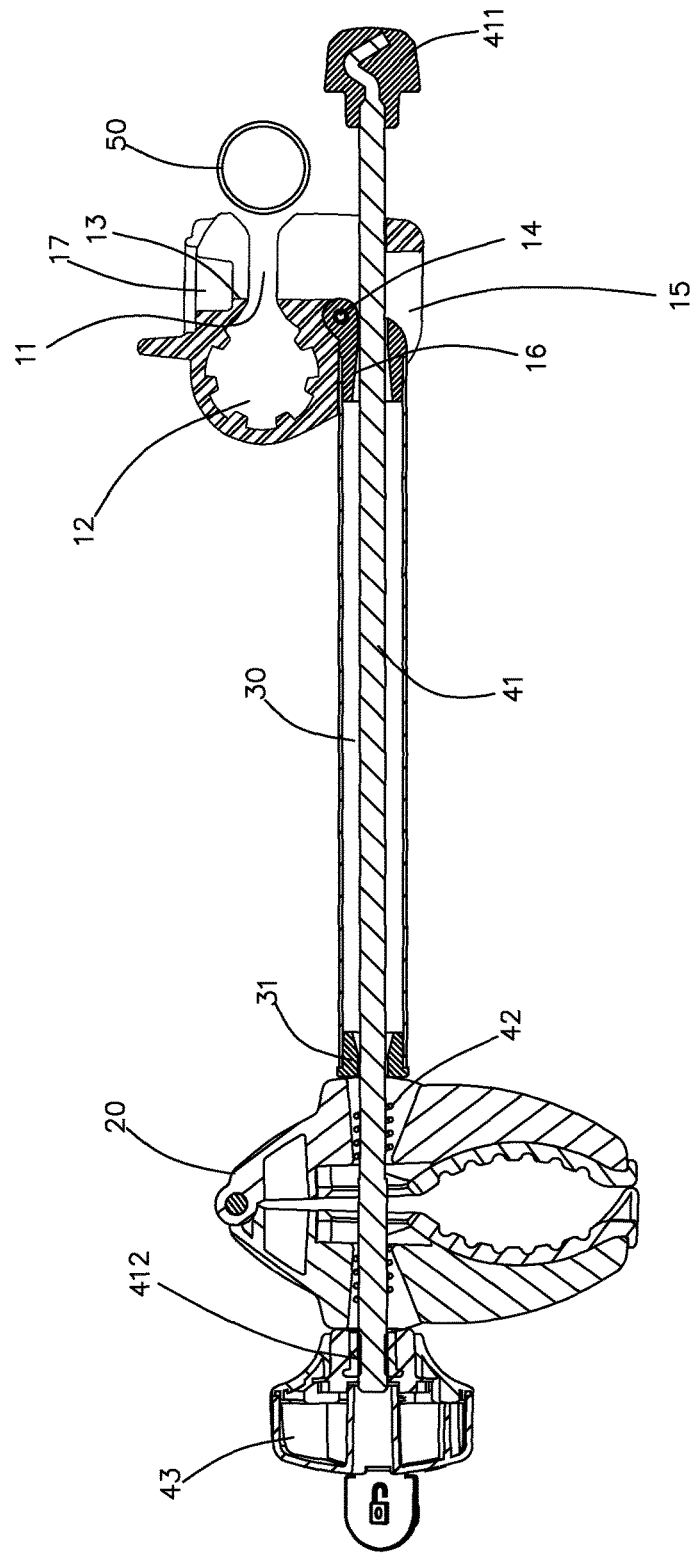
FIG. 6 shows that the first clamp unit is pivoted about the pivotal portion, and the pin is separated from the notch.
Figure 7:
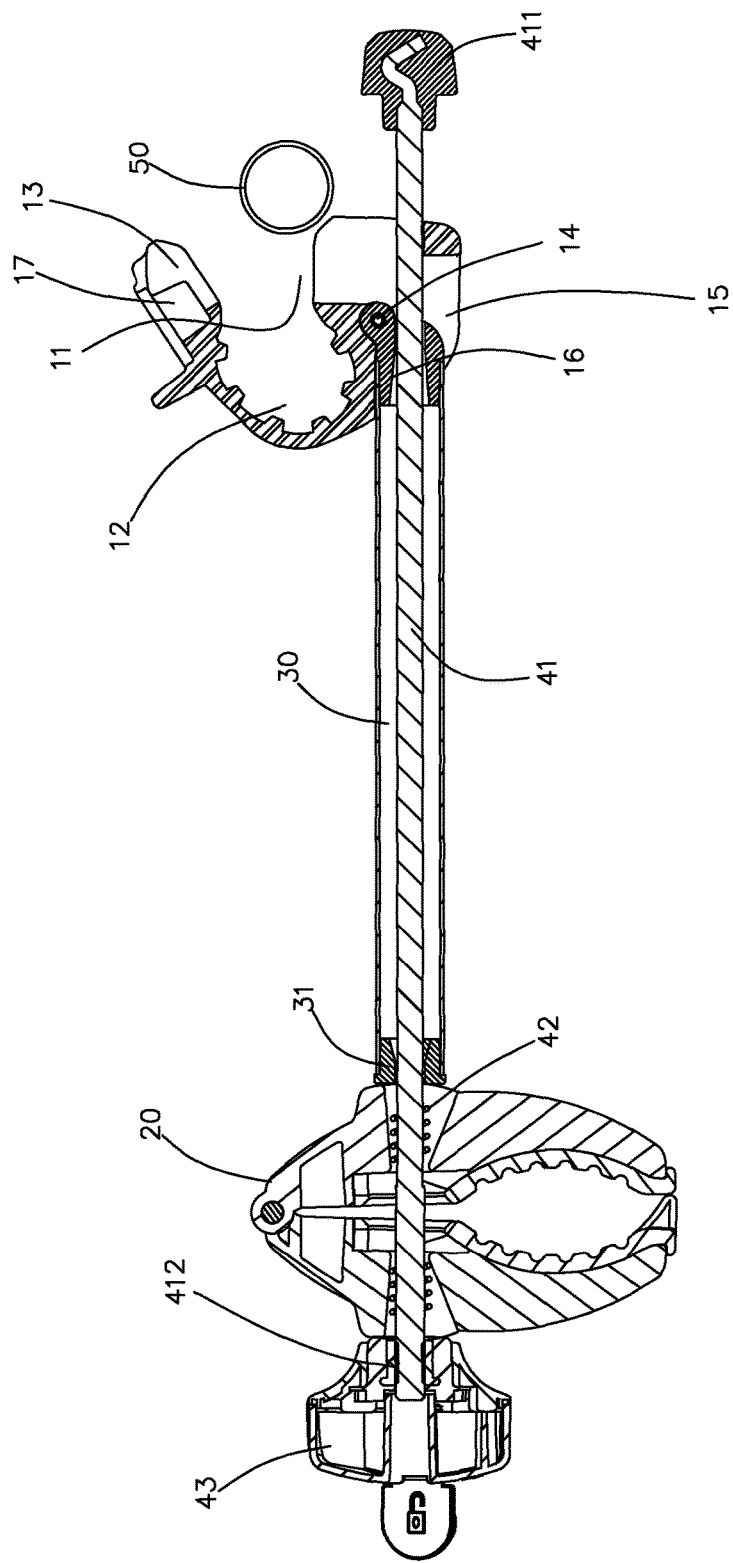
FIG. 7 shows that the clamping slot is slightly opened to enlarge the entrance.

As shown in FIGS. 3, 5 and 6, the first clamp unit 10 is a C-shaped unit and includes a clamping slot 12 and an entrance 11 which communicates with the clamping slot 12. A notch 13 is defined in the first clamp unit 10 and communicates with the entrance 11. One end of the pin 41 that is connected to the head 411 is engaged with the notch 13. The clamping slot 12 of the first clamp unit 10 is used to clamp the frame 50 of a bicycle carry rack via the entrance 11. The first clamp unit 10 has a pivotal portion 14 which is transversely located below the clamping slot 12 so that the first clamp unit 10 is pivotable about the pivotal portion 14. A receiving groove 15 is defined in the first clamping unit 10. A contact portion 16 is formed between the clamping slot 12 and the receiving groove 15. A restriction recess 17 is defined in top of the first clamp unit 10 and located opposite to the receiving groove 15, and the head 411 is removably located in the restriction recess 17 of the first clamp unit 10.

Figure 4:
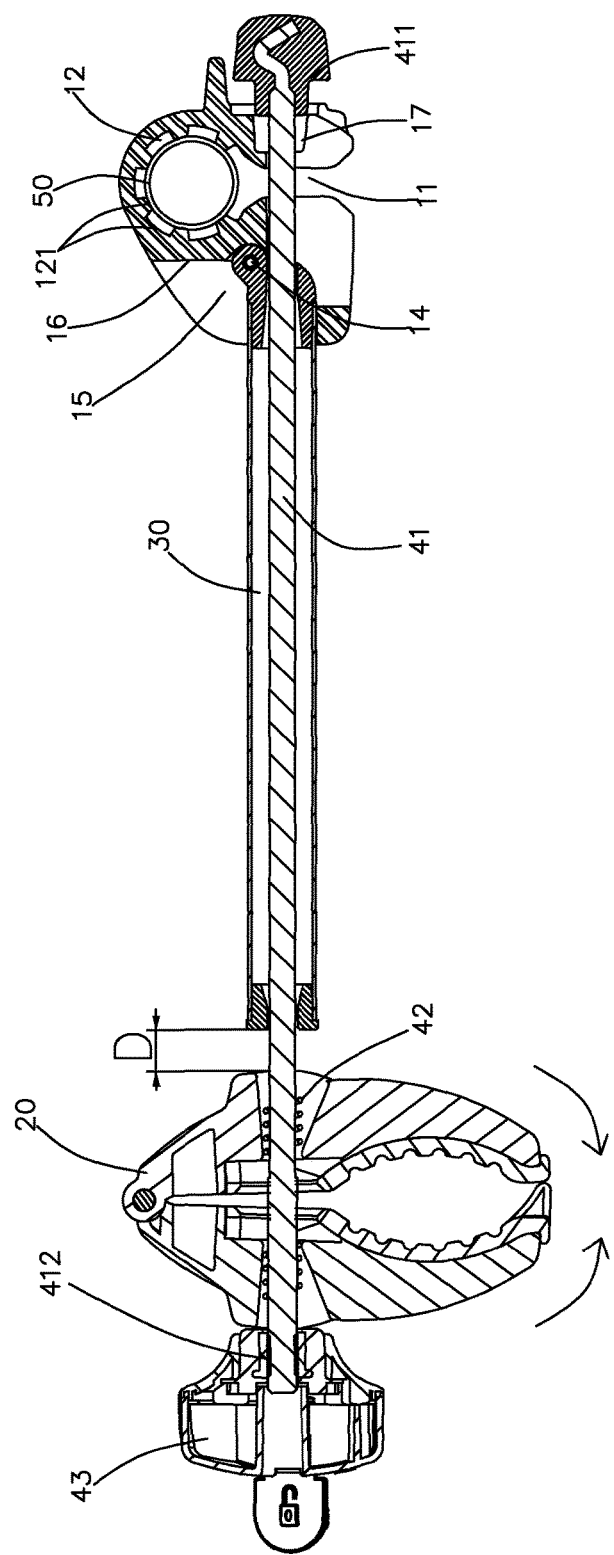
FIG. 4 shows that the second clamp unit clamps, and a distance is formed between the tube and the second clamp unit.
Figure 8:
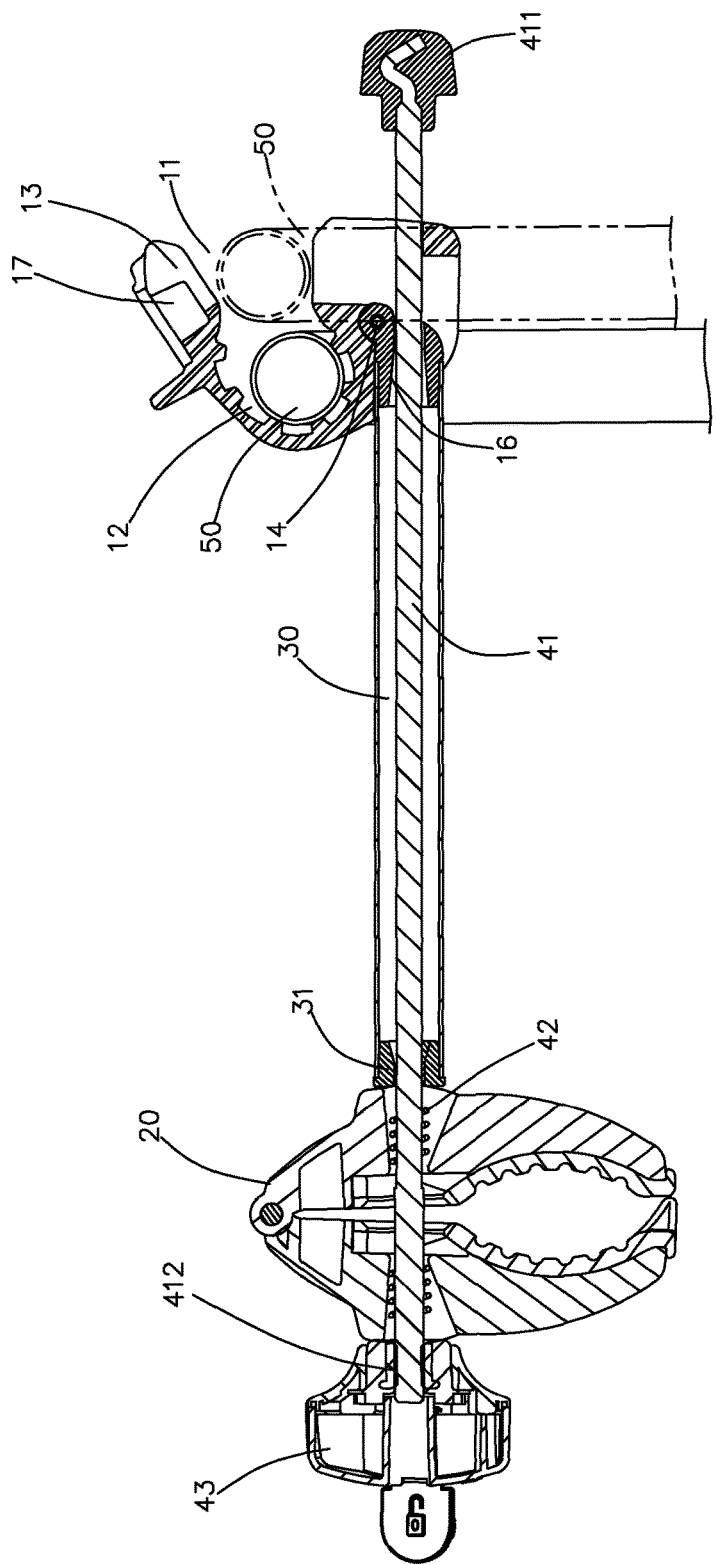
FIG. 8 shows that the clamping slot is about to clamp the frame of the bicycle carry rack.
Figure 9:
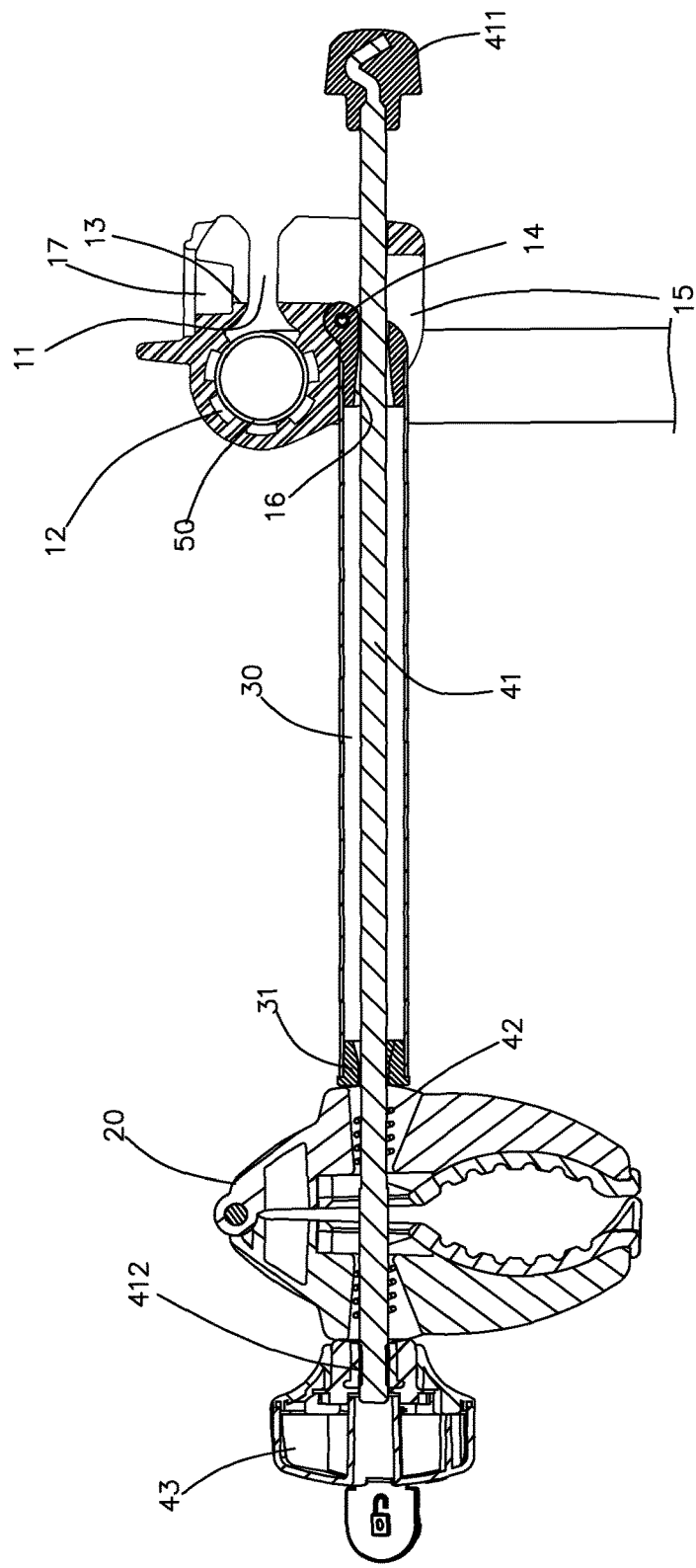
FIG. 9 shows that the clamping slot clamps the frame of the bicycle carry rack.
Figure 10:
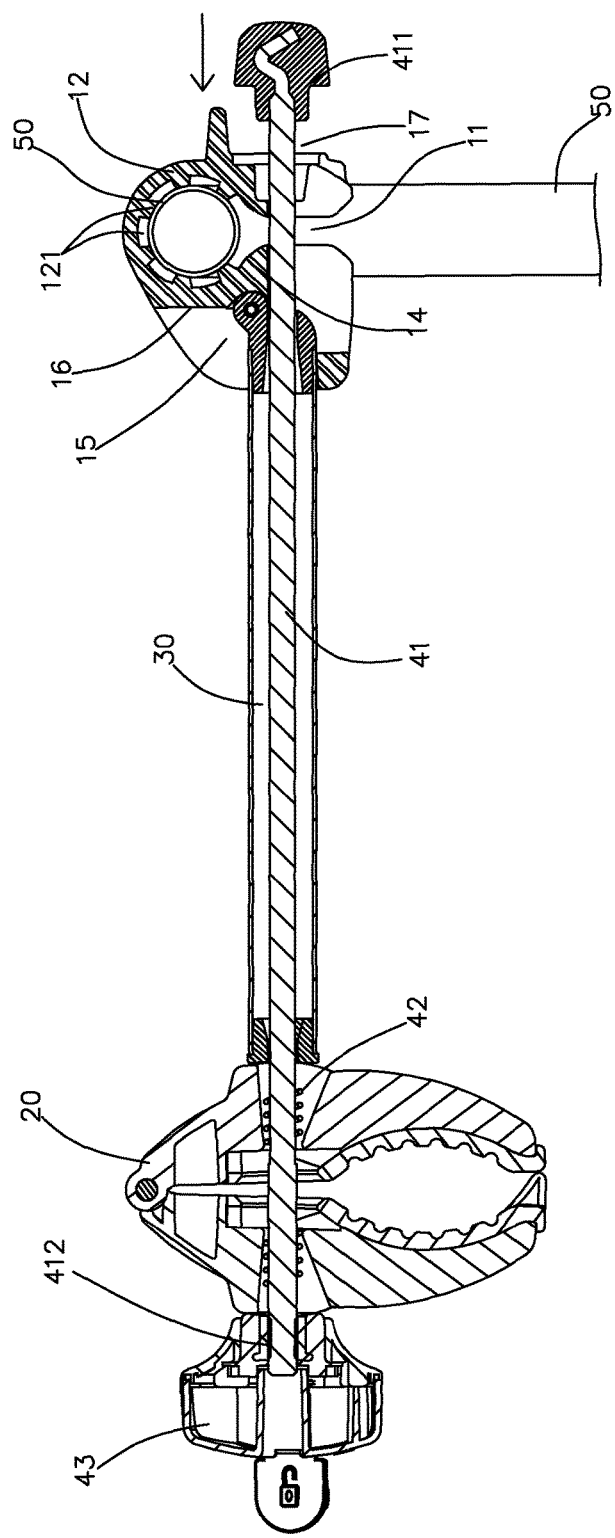
FIG. 10 shows that the first clamp unit is pivoted back and the pin is engaged with the notch again.
Figure 11:
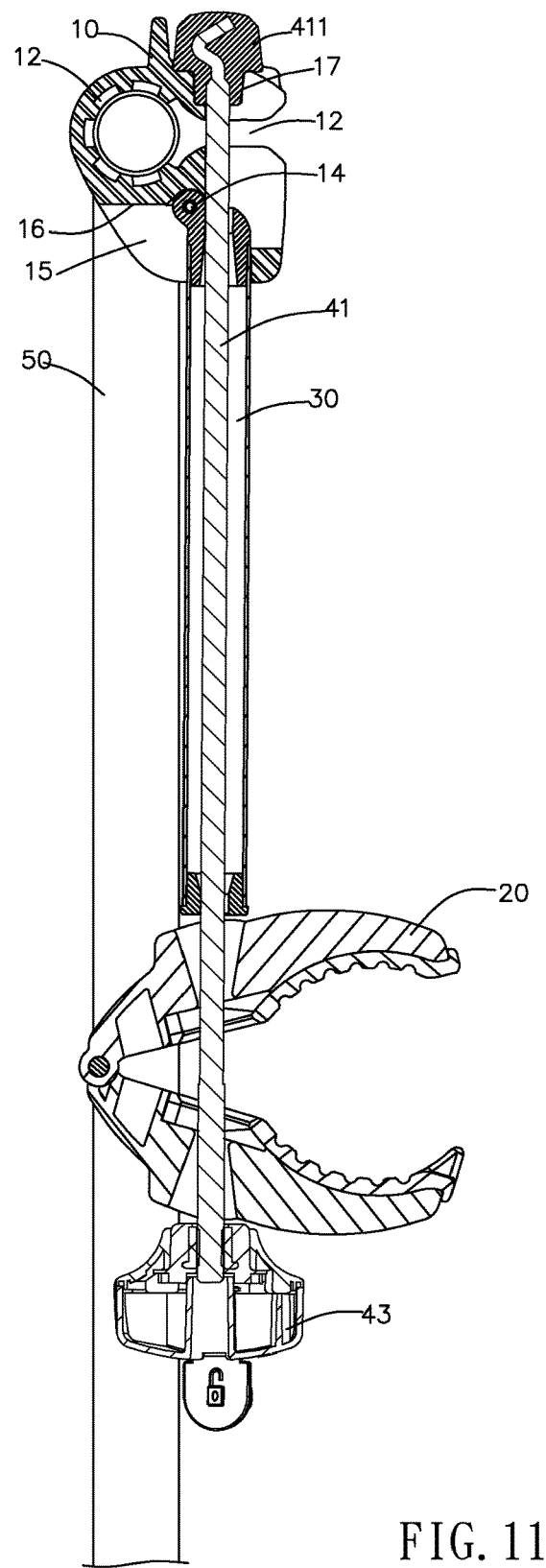
FIG. 11 shows that the frame of the bicycle carry rack is clamped by the clamping slot of the first clamp unit.
Figure 12:
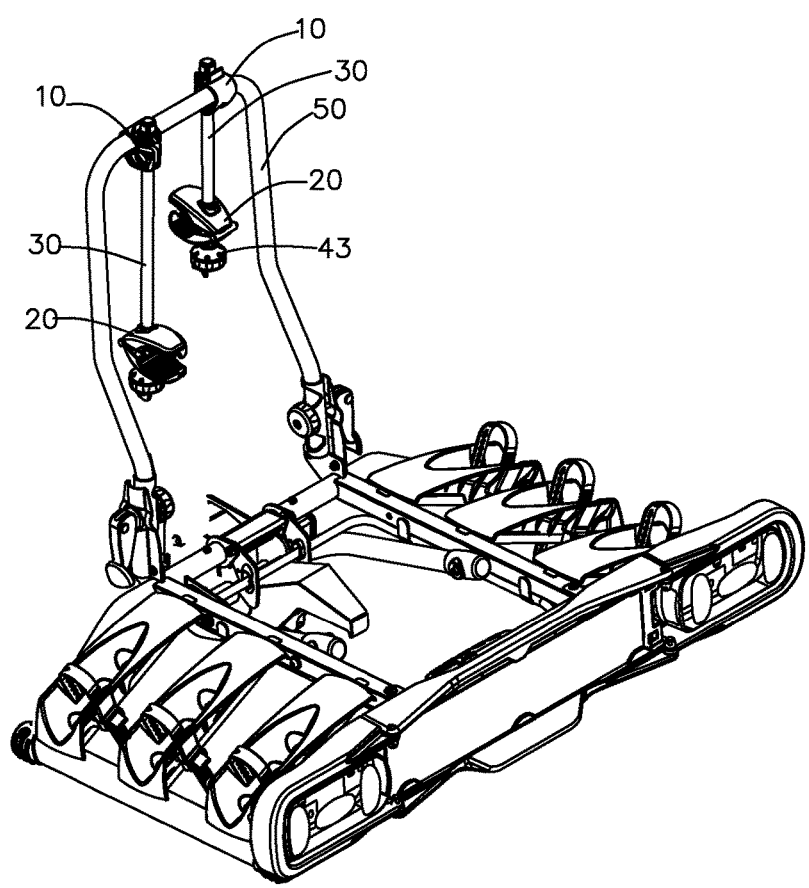
FIG. 12 shows two clamping devices of the present invention are connected to the frame of the bicycle carry rack.

As shown in FIG. 4, when the second clamp unit 20 clamps, the spring 42 is compressed and separated from the end member 31, so that the tube 30 is moved to travel a distance "D". Therefore, the head 411 on the pin 41 is separated from the restriction recess 17 as shown in FIG. 5. The first clamp unit 10 is then able to be pivoted and the contact portion 16 contacts the tube 30 as shown in FIG. 6. The first clamp unit 10 is made by a material that has a certain level of flexibility, so that the clamping slot 12 can be slight enlarged as shown in FIGS. 8 and 9, so that the size of the entrance 11 is enlarged. Therefore, the frame 50 for the bicycle carry rack can be easily pushed into the clamping slot 12 via the entrance 11 as shown in FIGS. 8 and 9. As shown in FIG. 10, the first clamp unit 10 is then pivoted back, and the pin 41 is engaged with the notch 13. The second clamp unit 20 is then released, the recovery force of the spring 42 forces the head 411 on the pin 41 to be engaged with the restriction recess 17. By operating the knob 43 to lock the first and second clamp units 10, 20 relative to the tube 30. This pushing action to clamp the frame 50 of the bicycle carry rack by the clamping slot 12 is easy and convenient. FIGS. 11 and 12 show the clamping devices of the present invention are connected to the frame 50 of the bicycle carry rack. The clamping force of the second clamp 20 can be adjusted by rotating the knob 43.

Preferably, the clamping slot 12 includes ridged portion 121 on which provides better grip force when clamping the frame 50 of the bicycle carry rack. Alternatively, a pad made of soft material is put on the ridged portion 121 so that when the pad is in contact with the frame 50 of the bicycle carry rack, the frame 50 of the bicycle carry rack is not scratched by the second clamp 20.

Preferably, a guide portion 122 is formed at connection area between the clamping slot 12 and the entrance 11. The guide portion 122 guides the frame 50 of the bicycle carry rack into the clamping slot 12.

While we have shown and described the embodiment in accordance with the present invention, it should be clear to those skilled in the art that further embodiments may be made without departing from the scope of the present invention.

What is claimed is:

1. A clamping device for a bicycle carry rack, comprising:
a tube 30, a first clamp unit 10, a second clamp unit 20 and a fastening unit 40, the first clamp unit 10 and the second clamp unit 20 respectively located on two ends of the tube 30, an end member 31 connected to one end of the tube 30;
the fastening unit 40 having a pin 41 which includes a head 411 and a threaded end 412 respective formed on two ends thereof, the pin 41 extending through the first clamp unit 10, the tube 30, a spring 42, the second clamp unit 20 and threadedly connected to a knob 43 by the threaded end 412, the spring 42 connected to the second clamp unit 20, the fastening unit 40 connected between the first and second clamp units 10, 20, and
the first clamp unit 10 being a C-shaped unit and including a clamping slot 12 and an entrance 11 which communicates with the clamping slot 12, a notch 13 defined in the first clamp unit 10 and communicating with the entrance 11, the clamping slot 12 of the first clamp unit 10 adapted to clamp a frame 50 of a bicycle carry rack via the entrance 11, a pivotal portion 14 formed in the first clamp unit 10 and transversely located below the clamping slot 12, the first clamp unit 10 being pivotable about the pivotal portion 14, a receiving groove 15 defined in the first clamping unit 10, a contact portion 16 formed between the clamping slot 12 and the receiving groove 15, a restriction recess 17 defined in the first clamp unit 10 and located opposite to the receiving groove 15, and the head 411 removably located in the restriction recess 17.

2. The clamping device as claimed in claim 1, wherein the spring 42 is separated from the end member 31 by clamping the second clamp unit 20, and the tube 30 travels a distance so that the head 411 on the pin 41 is separated from the restriction recess 17, the first clamp unit 10 is pivoted and the contact portion contacts the tube 30, the clamping slot 12 is adapted to clamp the frame 50 of the bicycle carry rack via the entrance 11, and the pin 41 is engaged with the notch 13, the second clamp unit 20 is released to force the head 411 on the pin 41 to be engaged with the restriction recess 17.

3. The clamping device as claimed in claim 1, wherein the clamping slot 12 includes a ridged portion 121 which is adapted to clamp the frame 50 of the bicycle carry rack.

4. The clamping device as claimed in claim 1, wherein the clamping slot 12 includes ridged portion 121 on which a pad is put which is adapted to contact the frame 50 of the bicycle carry rack.

5. The clamping device as claimed in claim 1, wherein a guide portion 122 is formed at connection area between the clamping slot 12 and the entrance 11, the guide portion 122 is adapted to guide the frame 50 of the bicycle carry rack into the clamping slot 12.

\* \* \* \* \*